United States Patent [19]

Prucher

[11] Patent Number: 5,308,669
[45] Date of Patent: May 3, 1994

[54] CERAMICALLY REINFORCED STRUCTURAL MATERIALS AND METHOD OF MAKING SAME

[76] Inventor: Bryan Prucher, 52 N. Main, Clarkston, Mich. 48016

[21] Appl. No.: 542,778

[22] Filed: Jun. 25, 1990

[51] Int. Cl.$^5$ .......................... B32B 3/12; B32B 5/18; B32B 7/34
[52] U.S. Cl. ........................ 428/72; 264/313; 428/307.3; 428/311.1; 428/311.5; 428/312.2; 428/319.1; 428/320.2
[58] Field of Search ............. 428/72, 312.6, 73, 312.2, 428/312.8, 306.6, 307.3, 307.7, 309.9, 311.1, 311.5, 317.9, 319.1, 320.2; 264/313

[56] References Cited

U.S. PATENT DOCUMENTS

| | | | |
|---|---|---|---|
| 3,616,841 | 11/1971 | Walz | 164/34 |
| 3,962,081 | 6/1976 | Yarwood et al. | 210/69 |
| 4,026,746 | 5/1977 | Straw | 428/72 |
| 4,076,888 | 2/1978 | Perugini et al. | 427/229 |
| 4,302,502 | 11/1981 | Narumiya | 428/312.6 |
| 4,822,694 | 4/1989 | Randin et al. | 428/314.4 |

*Primary Examiner*—George F. Lesmes
*Assistant Examiner*—Christopher Brown
*Attorney, Agent, or Firm*—Weintraub, DuRoss & Brady

[57] ABSTRACT

A ceramic foam reinforced structural material is disclosed as comprising either a hollow-legged or a solid legged ceramic open-celled foam. The foam is saturated with or surrounded by a resilient polymeric or other ductile material such as a plastic, to obtain a structural member with the high compressibility of ceramics while eliminating the edge brittleness inherent therein. The ductile material further provides the material with suitably fastenable and workable surfaces. Where an impact barrier is desired to be made of the structural material the ceramic foam is disclosed as being filled at least partially with a flowable material such as a liquid or a gel.

16 Claims, 1 Drawing Sheet

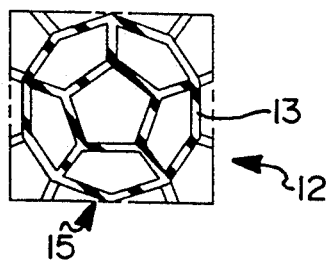
FIG 1A
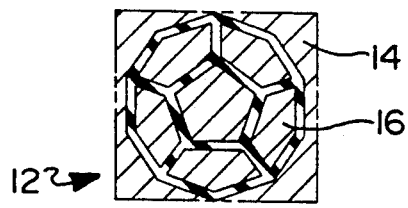
FIG 1B
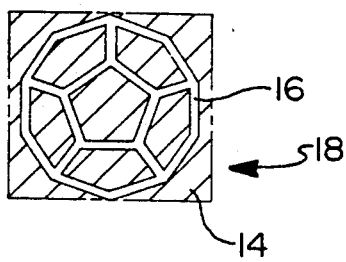
FIG 1C
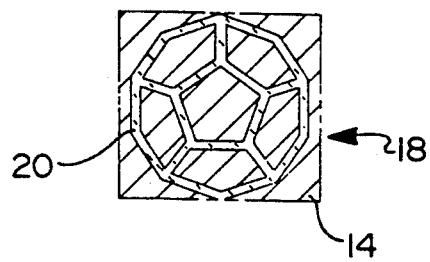
FIG 1D
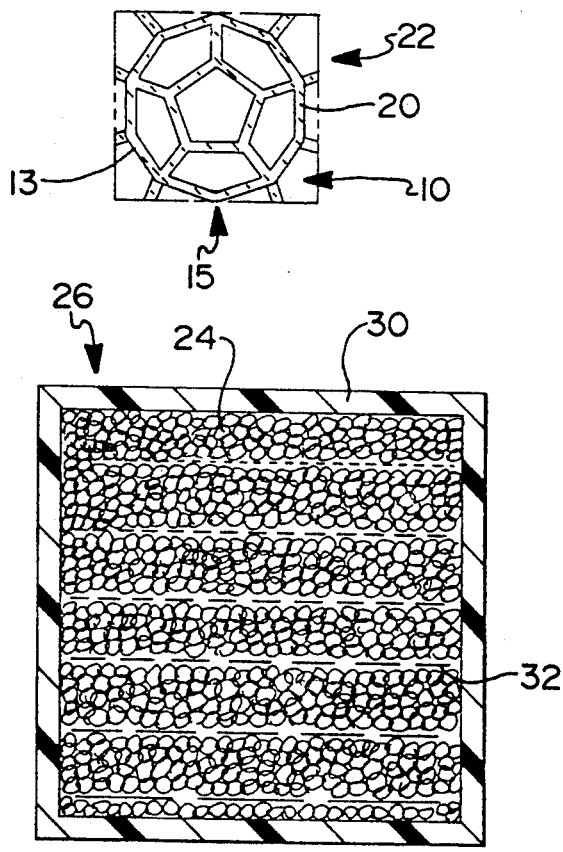
FIG 1E
FIG 3
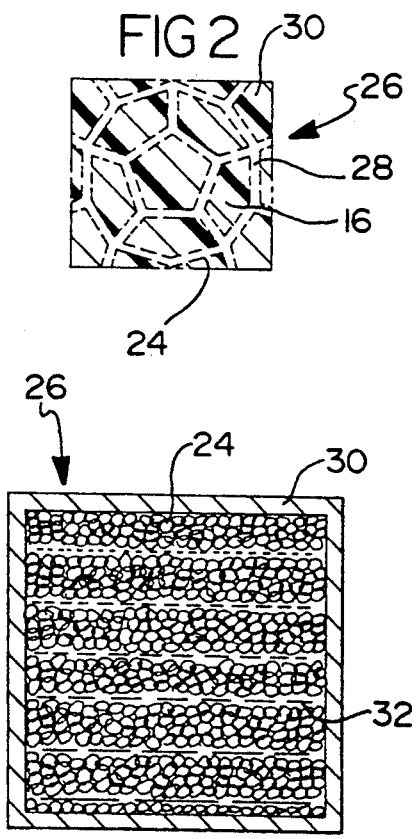
FIG 2
FIG 4

CERAMICALLY REINFORCED STRUCTURAL MATERIALS AND METHOD OF MAKING SAME

BACKGROUND OF THE INVENTION

1. Field of the Invention

The present invention relates generally to structural ceramics. More specifically, the present invention relates to ceramic foams saturated or sheathed in polymeric materials to provide an energy absorbent structural material; as well as a method of making the same.

2. Description of the Related Art

There are known in the ceramic arts open-celled ceramic foams such as discussed in applicant's prior application Ser. No. 486,801 filed Feb. 26, 1990, now abandoned. These foams are currently in use, as filter media, such as those available from Consolidated Aluminum of St. Louis, Mo. These open-cell ceramic foam bodies are manufactured by impregnating an open-cell polyurethane or other organic foam with a ceramic slurry. The excess slurry is then squeezed out and the impregnated foam is fired to decompose the polyurethane foam, resulting in a pseudo-positive ceramic replica of the original foam body. The term pseudo-positive is used because the actual legs, or structural members, of the ceramic foam are hollow and represent only that part of the ceramic which has coated the underlying organic foam. This ceramic foam has high compressive strength due to the inherently high compressive strength of ceramic materials and owing to its three dimensional repeating dodecahedral structure.

Further desirable characteristics of ceramic materials for use in structural applications include their low reactivity with the environment, their relatively low costs and abundant supply of raw materials, and their relatively light weight, especially when considered in the present instance of foam bodies.

While the aforedescribed ceramic foam body with hollow legs is admirably suited to its intended task as a filter media, it would need certain improvements to be used as a skeletal structure for structural members owing to its brittleness, a property of most ceramics; its susceptibility to surface abrasion; and would require suitable means for anchoring mechanical fasteners or the like to the foam. Accordingly, it would be desirable to produce a structural material having a low-weight, high-compressive strength, skeleton of ceramic foam which is strong, surface-abrasion resistant, and which easily accepts fastening means so as to be used in a variety of structural applications. Further it may be desirable in certain applications to provide a ceramic foam skeletal structure having solid-legs rather than the aforedescribed hollow legs for increased structural integrity.

SUMMARY OF THE INVENTION

It is an object of the present invention to provide a structural material utilizing the inherent advantages of ceramic foams while minimizing the drawbacks thereof. Accordingly, there is disclosed a method of producing a high strength solid-legged foam. There are also disclosed structural members which utilize ceramic foams in combination with tough, resilient, polymeric or other substantially ductile material. Accordingly, there is disclosed herein a ceramic foam reinforce structural material comprising an open-cell ceramic foam core filled, or saturated, with polymeric material. Alternatively, the polymeric or other ductile material may be used as a non-porous barrier encasing an unfilled or fluid-filled ceramic foam core. Preferably, the ceramic foam core has a repeating dodecahedral structure with hollow legs forming the skeleton of the foam since this foam is readily available and less costly to produce. Solid legged foam may also be used. Also preferably, any saturating or barrier polymeric or other ductile material should be tough, resilient, and substantially rigid yet flexible, to serve as a anchor for mechanical fasteners and to stabilize the open-celled ceramic foam.

Where the structural material is designed to withstand impact, such as in the case of a highway barrier or the like, a flowable material is preferably located within the ceramic foam to distribute the force of impact throughout the skeletal structure. Such a flowable material may include common liquids such as water or a stable gel material such as known in the art.

In applications where impact resistance is not a major concern, a resilient polymeric filler saturating the ceramic for a polymeric surface barrier will usually suffice to distribute incidental impact or compression forces over the face of the ceramic foam core thereby minimizing the chance for damage to the underlying ceramic surface where the brittle characteristics of the ceramic would be most conspicuous.

Various types of ceramic materials are known which may be utilized in the following invention. The material selected would be dependent upon individual design parameters and working characteristics of the ceramic when utilized within the scope of the present invention.

Also according to the present invention, a solid leg open-celled foam may be made by starting with an open-celled carbon-base, or other easily destructible, foam. The foam is completely filled, or saturated, with a material which will withstand the destructive process performed on the original foam. The original open-cell foam is then destroyed thereby leaving a true negative mold of the original foam. To this true negative mold will be added the desired ceramic composition, which will then be hardened. The material comprising the negative mold will then be destroyed leaving a true positive solid leg ceramic foam having properties consistent with the objectives of the current invention and usable as an alternative to the now known ceramic foam materials.

Other advantages will be more readily appreciated as the same becomes better understood by reference to the following detailed description and considered in connection with the accompanying drawings in which like reference numerals designate like parts throughout the figures.

BRIEF DESCRIPTION OF THE DRAWINGS

FIGS. 1A-1E illustrate the various stages in making a solid-leg open-celled ceramic foam.

FIG. 2 is a cross-section of a ceramically reinforced saturated polymeric structural panel according to the present invention.

FIG. 3 is a cross-section of another embodiment of the present invention wherein polymeric material covers the exterior faces of the ceramic foam.

FIG. 4 is an alternative embodiment of FIG. 3 wherein a ductile metal is used as a barrier facing the ceramic foam.

DESCRIPTION OF THE PREFERRED EMBODIMENT

As shown in FIGS. 1A-1E, there are generally five stages to making the solid legged open-celled ceramic foam 10 according to the present invention. As seen in FIG. 1A, an open-celled carbon base foam 12 is constituted of polyurethane, or other suitable equivalents. The original foam is shaped, or preformed to the shape of the ultimately desired open-celled ceramic foam 10. In FIGS. 1A-1E are illustrated a single dodecahedral cell of the preferred foam. It will be understood that the foams comprise a three dimensional repeating structure of such cells. Preferably, the open-celled ceramic foam used in the structural members, whether solid or hollow-legged, will be of this three dimensional repeating or random dodecahedral structure with the legs 13 of the foam 12 forming pentagonal cell walls 15, as is known in the art, and of which the structural advantages have long been known to the public through the works of R. Buckminster Fuller. It will be appreciated that the actual foams will be less regular than the cells illustrated in the drawing figures and may comprise irregularly sized or shaped cells within the foam. It is contemplated that if a completely regular foam is desired, such a foam could be constructed as a block or in layers through stereolithography techniques.

As seen in FIG. 1B, the open-celled carbon base foam 12 will be completely filled, or saturated, with a material 14 able to form a structural negative of the original foam 12. This negative mold material 14 must also be able to withstand the destruction of the original open-celled foam 12 whether by chemical or physical processes, such as chemical dissolution or burning, respectively. The characteristics of the negative mold material 14 would, of course, be matched to the selected type of original open-celled foam 12 with possible materials including Wood's metals, low melting point ceramic slurries, and dissolvable ceramics, such as are known in the art.

After all voids 16 within the original foam 12 are completely filled with negative mold materials 14, the negative mold material 14 will be caused to solidify by known means and the original open-celled foam 12 will be destroyed and removed therefrom, leaving a true negative mold 18 (FIG. 1C) of the original open-celled foam 12. That is, the negative mold 18 will have voids 16 where the legs 13 of the original open-celled foam 12 once were.

As seen in FIG. 1D, the negative mold 18 as shown in FIG. 1C, will then be filled with a slurry of the ceramic composition 20 having the desired structural characteristics. As an alternative, instead of slurry, other known methods of ceramic deposition may be used such as air flow of solid powders, vapor deposition, or the like, to deposit the desired ceramic 20 within the negative mold 18.

Once the true negative mold 18 has been completely filled with the desired ceramic composition 20 it will be "fired" or otherwise caused by known means to set the desired ceramic composition 20 into a true positive replica 22 (FIG. 1E) of the original carbon based open-celled foam 12. The resultant solid leg open-celled ceramic foam 10 has a desirable dodecahedral repeating structure with the legs 13 of the pentagonal faces 15 being solid, thereby adding to the rigidity of the foam 10.

As seen in FIG. 2, the ceramic reinforced structural material 26 of the present invention comprises a polymeric material 30, such as polyurethane or other varieties of plastics. Alternately other ductile material such as aluminum, or various other metals or metal alloys could be used in place of polymerics. The ductile material is located within the voids 16, or interstices, of an open-celled ceramic foam 24. The open-celled ceramic foam 24 of the ceramic reinforced polymeric material 26 is illustrated as having hollow legs 28. It will be appreciated by the artisan that either solid or hollow legged open-celled ceramic foams may be used for the present invention, although it is anticipated that hollow legged foams will be somewhat more economical for most applications.

The polymeric material 30 will be used to fill the ceramic foam 24 to form a structural material combining the high compressive strength and low environmental reactivity of ceramics with the resilience and toughness of the polymeric filler material 30 so that the structural material resulting therefrom may be easily worked using substantially conventional tools and mechanical fastenings. That is, the resilient and tough polymeric filler material 30 will allow the otherwise brittle, but strong, ceramic foam 24 to be utilized in a variety of structural applications.

The ceramic foam 24 will generally be preheated and then either immersed in, or injected with a molten, or flowable, polymeric filler material. When the ceramic foam 24 is either completely or substantially filled or saturated with the polymeric filler material 30, the resultant combination is then cooled to form a solid.

As seen in FIG. 3, the ceramic foam 24 may alternatively be left substantially unfilled, and covered on its exterior faces with a barrier of polymeric material 30 by means such as dipping, spraying, shrink molding, or the like. As seen in FIG. 4, metals or metal alloys/may also form a suitable barrier. The polymeric material 30 may extend into the foam core 24 or may surround the foam 24 and rest thereon. In either case the ductile material will form a barrier between the exterior faces and interior core of the foam 24. The polymeric or other ductile material 30 will aid in transferring forces to the high compression strength ceramic foam 24 underneath while alleviating problems associated with the ceramic foam brittle edges. Any and all arrangements of the foam and the ductile material to combine their desirable properties will be referred to as an operative attachment. The polymeric or other ductile material also provides a suitable fastening point for any structure made according to the present invention.

As seen in FIG. 3, in the case of impact barriers, such as those found on highways, the polymeric or other ductile material 30 will enable the ceramic foam 24 to retain water 32 or gel which would disperse impact forces throughout the foam resulting in a long life impact barrier which is cheap, light weight until filled with liquid or gel on-site, and easily formable to desired shapes.

Besides impact barriers, the ceramic foam reinforced polymeric or other ductile material 26 would also find applications in the building trade where a high compressive strength panel is needed. For example, loading bearing beams could be made according to the present invention and lifted into place quite easily due to their light weight. Substantially conventional tools and methods of working the structural material of the present invention are envisioned to allow a wide variety of applications therefor. The structural material according to the embodiment of FIG. 3, would, for instance, find suitable application in wall panels where it would be an efficient insulator due to its open-celled structure.

Having, thus, described the invention, what is claimed is:

1. A ceramic foam reinforced structural material comprising:
   (a) an open-cell ceramic foam core having an exterior surface and having a three dimensional repeating structure with interconnecting solid legs and voids formed therebetween;
   (b) a ductile material which is operatively attached to the ceramic foam core; and
   wherein the ductile material forms a barrier covering the exterior surface of the foam.

2. The structural material of claim 1 wherein at least a portion of the ductile material is located within the voids of the foam.

3. The structural material of claim 2 wherein the ductile material substantially saturates the foam.

4. The structural material of claim 2 wherein the ceramic foam core has a repeating dodecahedral structure to maximize the structural strength thereof.

5. The structural material of claim 2 wherein the ductile material is polymeric.

6. The structural material of claim 1 further comprising:
   a flowable material located within the voids of the ceramic foam core.

7. The structural material of claim 6 wherein the flowable material is a liquid.

8. The structural material of claim 6 wherein the flowable material is gel.

9. The structural material of claim 1 wherein the ceramic foam core has a repeating dodecahedral structure to maximize the structural strength thereof.

10. The structural material of claim 1 wherein the ductile material is polymeric.

11. A method of making a ceramically reinforced structural material comprising substantially filling at least some of the voids of an open-celled ceramic foam with ductile material, the foam having a substantially regular repeating dodecahedral cell structure with solid legs defining the structure.

12. The method of claim 11 further comprising the step of making the ductile material flowable before placing it within the ceramic foam, and thereafter causing the flowable material to solidify.

13. The method of claim 11 further comprising the step of heating the ceramic foam to aid in the filling of the voids.

14. The method of claim 11 wherein the ceramic foam is substantially saturated with the polymeric material.

15. The method of claim 11 wherein the ductile material used is one selected from a group comprising polymeric materials; metals; and metal alloys.

16. A method of making a solid leg ceramic open-celled foam which is a positive mold of an initial destructible open-celled foam, for use in structural material comprising the steps of:
   (a) saturating an initial destructible open-celled foam with a material capable of creating a negative mold of the open-celled foam;
   (b) destroying the original open-celled foam while leaving the negative mold material intact to create a negative mold of the original foam;
   (c) filling the negative mold with a ceramic composition to create a positive mold of the original foam and causing the ceramic composition to solidify; and,
   (d) removing the negative mold material from the hardened ceramic composition.

* * * * *